United States Patent [19]
Shinzawa

[11] Patent Number: 5,174,259
[45] Date of Patent: Dec. 29, 1992

[54] FUEL INJECTION CONTROL SYSTEM FOR TURBOCHARGED DIESEL ENGINE

[75] Inventor: Motohiro Shinzawa, Yokosuka, Japan

[73] Assignee: Nissan Motor Company, Ltd. No. 2, Yokohama, Japan

[21] Appl. No.: 554,493

[22] Filed: Jul. 19, 1990

[30] Foreign Application Priority Data

Jul. 20, 1989 [JP] Japan .................. 1-188638

[51] Int. Cl.$^5$ .................. F02M 37/04
[52] U.S. Cl. .................. 123/357; 123/393; 123/383
[58] Field of Search .................. 123/357, 358, 359, 370, 123/371, 382, 383, 391, 393

[56] References Cited

U.S. PATENT DOCUMENTS

| | | | |
|---|---|---|---|
| 2,374,411 | 4/1945 | Camner | 123/383 |
| 2,988,872 | 6/1961 | Reggio | 123/393 |
| 3,557,898 | 1/1971 | Emery | 123/393 |
| 4,051,821 | 10/1977 | Amann | 123/393 |
| 4,368,205 | 1/1983 | Stevenson | 123/357 |
| 4,426,982 | 1/1984 | Lehner | 123/357 |
| 4,485,782 | 12/1984 | Sakakibara | 123/391 |
| 4,493,303 | 1/1985 | Thompson | 123/357 |
| 4,502,437 | 3/1985 | Voss | 123/357 |
| 4,721,085 | 1/1988 | Adams | 123/393 |

FOREIGN PATENT DOCUMENTS

| | | | |
|---|---|---|---|
| 0041429 | 4/1981 | Japan | 123/383 |
| 60-3246 | 1/1985 | Japan | . |
| 60-104743 | 6/1985 | Japan | . |
| 62-159739 | 7/1987 | Japan | . |
| 62-223423 | 10/1987 | Japan | . |
| 63-177638 | 11/1988 | Japan | . |

Primary Examiner—Carl Stuart Miller
Attorney, Agent, or Firm—Pennie & Edmonds

[57] ABSTRACT

The supercharge pressure and the pressure differential which develops between the supercharge pressure and the exhaust gas pressure upstream of a turbocharger turbine are monitored. In the event that the supercharge pressure is below a target level which is determined to optimal for the instant set of operating conditions, a first injection reduction amount is calculated. To allow for the effect of very sudden accelerations wherein the pressure differential tends to become large and the charging efficiency of the engine tends to reduce, a second reduction amount is calculated based on the difference between the actual differential and a target value for the instant set of operating conditions. The second reduction amount is also subtracted from the injection volume which is calculated based on the engine speed and a signal which is indicative of the power demand on the engine (the accelerator pedal depression degree).

4 Claims, 11 Drawing Sheets

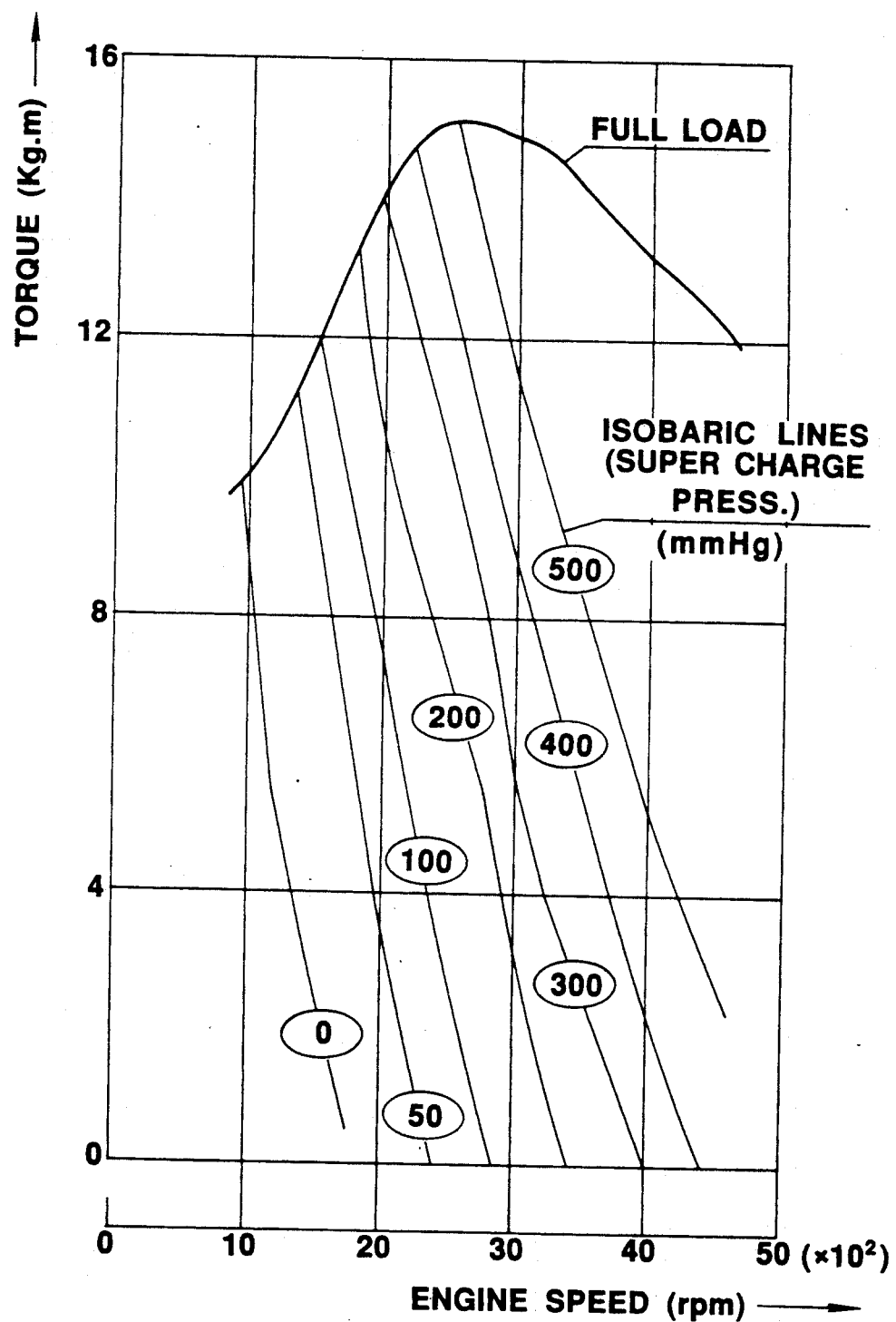

FUEL INJECTION CONTROL SYSTEM FOR TURBOCHARGED DIESEL ENGINE

BACKGROUND OF THE INVENTION

1. Field of the Invention

The present invention relates to a injection control system for a turbocharged diesel engine and more specifically to such an injection system which improves injection control during acceleration type modes of operation.

2. Description of Prior Art

SAE Paper 860145 and JP-U-63-177638 disclose electronic control systems for varying the injection timing and amount by distribution types of fuel injection pumps.

FIG. 10 shows such a distribution fuel injection pump 1 wherein a drive shaft 4, which is adapted for connection with an output shaft of diesel type internal combustion, is arranged to drive a vane type feed pump 2. Fuel is inducted from a non-illustrated source into a pump chamber 5 and transferred via passage 6 into a plunger chamber 12 of a plunger pump 3.

One end of the drive shaft 4 is connected to a cam/roller arrangement (elements 9, 9a, 9b, 10, 11) which is located at one end of a plunger 7 and which translates the rotary movement of the drive shaft 4 into both reciprocal and rotational movement of a plunger 7.

The plunger is formed with a plurality of grooves 8 which enable fuel to be forced via a non-illustrated delivery valve to the respective injection nozzles.

The arrangement further includes a rapid acting electromagnetic injection control valve 14. This rapid acting valve 14 is arranged with the plunger pump in a manner wherein, that during the compression phase of the pump, when the valve 14 is closed, injection is initiated and when the valve is opened injection is terminated. In other words the initiation and termination of the injection is controlled by this valve. By controlling the period between the initiation and the termination, the amount of fuel injected can be controlled.

The operation of this valve is controlled by a non-illustrated control unit which includes a microprocessor and which is supplied with plurality of data inputs. These inputs take the form of an engine speed, accelerator pedal depression, engine coolant temperature, fuel temperature and the like.

A ROM which forms part of the above mentioned control unit microprocessor includes a program for determining the initiation and termination timing (and hence the injection amount) in accordance with the operating conditions of the engine.

During actual operation of this arrangement two pulse trains are produced. As shown in FIG. 11 the first contains on reference pulse per rotation of the pump while the second contains thirty six scale pulses. In accordance with the engine speed, the accelerator pedal depression degree, the engine coolant and fuel temperatures, a basic fuel injection amount is read out of memory and used in combination with the above mentioned to produce a valve actuation pulse which is supplied to the valve 14.

However, in the vent the above type of injection control arranged is applied to a turbocharged type diesel engine, a problem has been encountered in that the turbocharger requires a finite time to respond to changes in engine operation/load (viz., exhibits so called turbo lag). That is to say, when the engine is subject to sudden acceleration such as vehicle movign away from from standstill or immediately following a gear change, the delay in the turbocharger response (turbo lag) induces a corresponding delay in amount of air which is supplied to the engine being increased to the desired level. At this time, despite the delay in boost from the turbocharger, the amount of fuel injected is controlled in accordance with the amount of accelerator pedal depression. This brings about the formation of an excessively rich air-fuel mixture and leads to the formation of smoke and a reduction in combustion efficiency.

In order to overcome this problem it has been proposed in JP-A-60-104743 to detect the presence of engine acceleration and to reduce the formation of smoke by reducing the maximum load injection amount. An alternative proposal disclosed in JP-A-62-223423 has included sensing the pressure prevailing downstream of the turbocharger compressor and the engine and determining a first injection amount which is selected to generate a limited amount of smoke, and a second amount which is determined using the accelerator pedal depression egree and selecting the optimum injection amount for non-transitory engine operation. The first and second amounts are compared and smaller is used for actual injection control.

Nevertheless, as the amount of air per se which is actually inducted is not directly sensed, it is very difficult to determine just how much air is actually charged into the engine cylinders and how much to reduce the injection volume. As a result an inevitably deterioration in the engine output characteristics has resulted.

Further, as different from non-transitory engine operation, during acceleration, the rise in exhaust pressure prevailing upstream of the turbocharger turbine (hereinafter referred to as exhaust pressure) occurs before the supercharge pressure increases, a pressure pressure differential develops between the exhaust and supercharge pressurse.

During sudden acceleration, the pressure differential tends to maximize and the charging efficiency tends to deteriorate with the degree of the acceleration. As a result, if the fuel amount is controlled in accordance with the supercharge pressure only, depending on the degree of acceleration, while the amount of smoke is reduce it is impossible to simultaneously prevent reductions in power output and fuel economy.

It should be noted that FIGS. 12 to 14 show respectively in terms of engine speed and pressure head, engine speed and supercharge pressure $P_B$ and engine speed and exhaust pressure $P_{EX}$, the relationships which develop between above mentioned parameters with turbocharged type diesel engines.

SUMMARY OF THE INVENTION

It is an object of the present invention to provide an arrangement via which the amount of fuel which is injected can be controlled in a manner which enables the suppression of smoke formation without impairing the desired levels of engine power output and fuel economy.

In brief, this object is accomplished by monitoring the supercharge pressure and the pressure differential which develops between the supercharge pressure and the exhaust gas pressure upstream of a turbocharger turbine. In the event that the supercharge pressure is below a target level which is determined to ptimal for the isntant set of operating conditions, a first injection reduction amount is calculated. To allow for the effect of very sudden accelerations wherein the pressure differential tends to become large and the charging efficiency of the engine tends to reduce, a second reduction amount is calcualted based on the difference between the actual differential and a target value for the isntant set of operating conditions. The second reduction amount is also subtracted from the injection volume which is calculated based on the engine speed and a signal which is indicative of the power demand on the engine (the accelerator pedal depression degree).

More specifically, a first aspect of the present invention comes in an internal combustion engine which features: an exhaust gas powered turbocharger; electronically controlled fuel injection means for controlling the injection of fuel into the engine, the electronically controlled fuel injection means being responsive to an injection control signal which determines the initiation timing and the period for which injectino is carried out; a supercharge pressure sensor for sensing the pressure prevailing in an induction system of the engine at a location downstream of a compressor of the turbocharger; an exhaust gas pressure sensor for sensing the exhaust pressure prevailing in an exhaust system of the engine at a location upstream of a turbine of the turbocharger; an engine speed snsor; a power output demand sensor for sensing the power output demand on the engine; control means responsive to the supercharge pressure snsor, the exhaust gas pressure sensor, the engine speed sensor and the power output demand sensor, the control means including circuitry for: determining a target injection amount based on the instant engine speed and power output demand conditions; determining a target supercharge pressure for the instant engine speed and power output demand conditions; comparing the target supercharge pressure with the sensed supercharged pressure and determining a first injection reduction amount in the event that the sensed supercharge pressure is lower than the target supercharge pressure; determining a target pressure differential which should exist between the supercharge pressure and the exhaust pressure; determining the difference between the supercharge pressure and the exhaust gas pressure and determining an actual pressure differential; comparing the target pressure differential and the actual differential and determining a second injection reduction amount in the vent that the actual pressure differential is greater than the target pressure differential; reducing the target injection amount by the first and second reduction amounts; and producing the injection control signal and applying it to the electronically controlled fuel injection control means.

A second apsect of the present invention comes in a method controlling an internal combustion engine having an exhaust gas powered turbocharger and an electronically controlled fuel injection means for injecting fuel into the engine, the electronically controlled fuel injection means being responsive to an injection control signal which determines the initiation timing and the period for which injection is carried out, the method featuring the steps of: sensing the pressure prevailing in an induction system of the engine at a location downstream of a compressor of the turbocharger; sensing the exhaust pressure prevailing in an exhaust system of the engine at a location upstream of a turbine of the turbocharger; sensing engine speed; sensing the power output demand on the engine; determining a target injection amount based on the instant engine speed and power output demand conditions; determining a target supercharge pressure for the instant engine speed and power output demand conditions; comparing the target supercharge pressure with the sensed supercharged pressure and determining a first injection reduction amount in the event that the sensed supercharge pressure is lower than the target supercharge pressure; determingin a target pressure differential which should exist between the supercharge pressure and the exhaust pressure; determining the difference between the supercharge pressure and the exhaust gas pressure and determining an actual pressure differential; comparing the target pressure differential and the actual differential and determining a second injection reduction amount in the event that the actual pressure differential is greater than the target pressure differential; reducing the target injection amount by the first and second reduction amounts; and generating the injection control signal and applying it to the electronically controlled fuel injection control means.

BRIEF DESCRIPTION OF THE DRAWINGS

FIGS. 5 and 6 are graphs which depict in terms of engine speed and engine torque (accelerator pedal depression degree), mapped data which is used in the present invention to determine target supercharge and pressure differential values which are used in connection with the calculation of first and second injection reduction amounts;

DETAILED DESCRIPTION OF THE PREFERRED EMBODIMENTS

Figure 2:
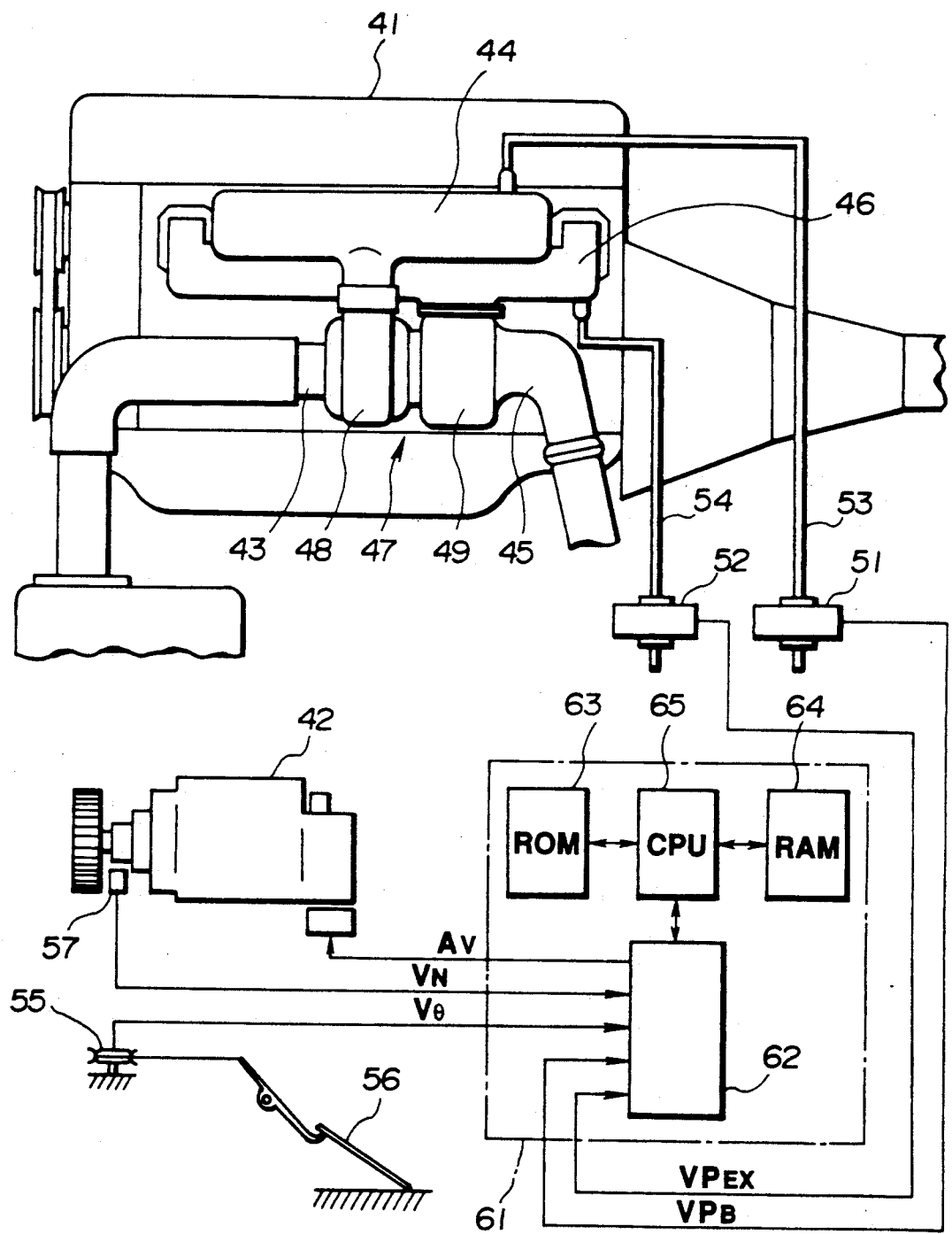
FIG. 2 shows an engine system of the type to which the present invention is applied.
Figure 10:
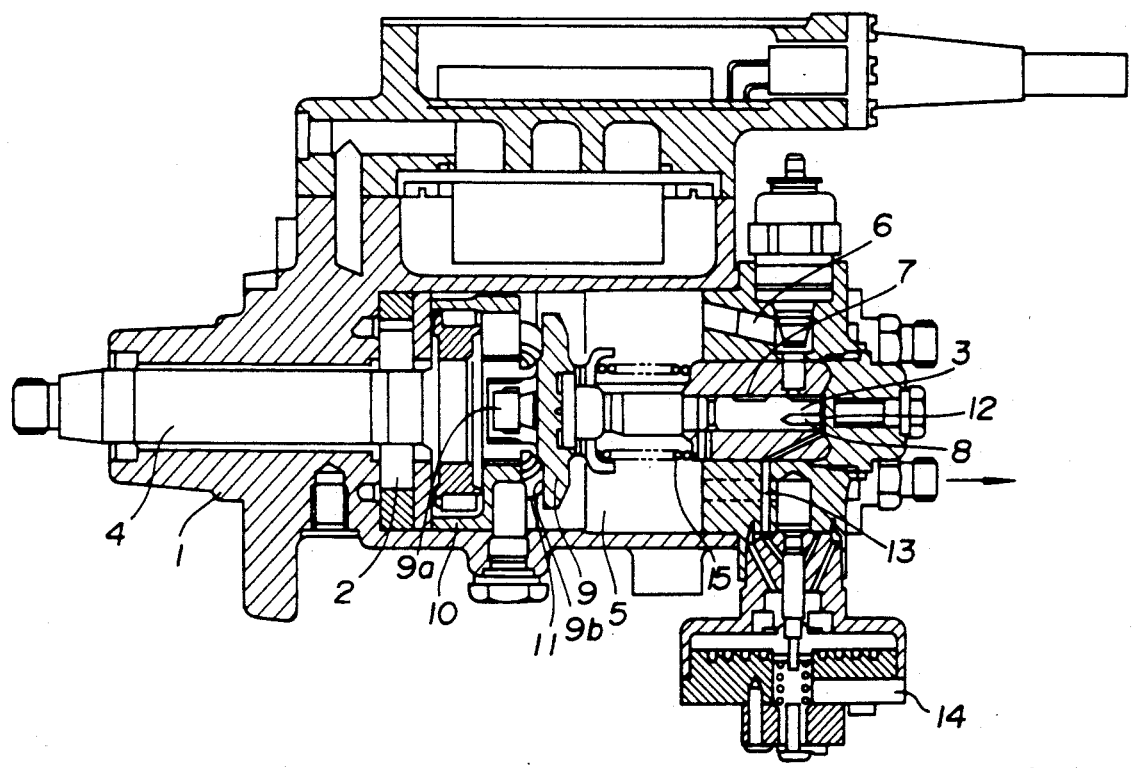
FIG. 10 is a sectional elevation showing a fuel injection pump discussed in the opening paragraphs of the present invention.
Figure 12:
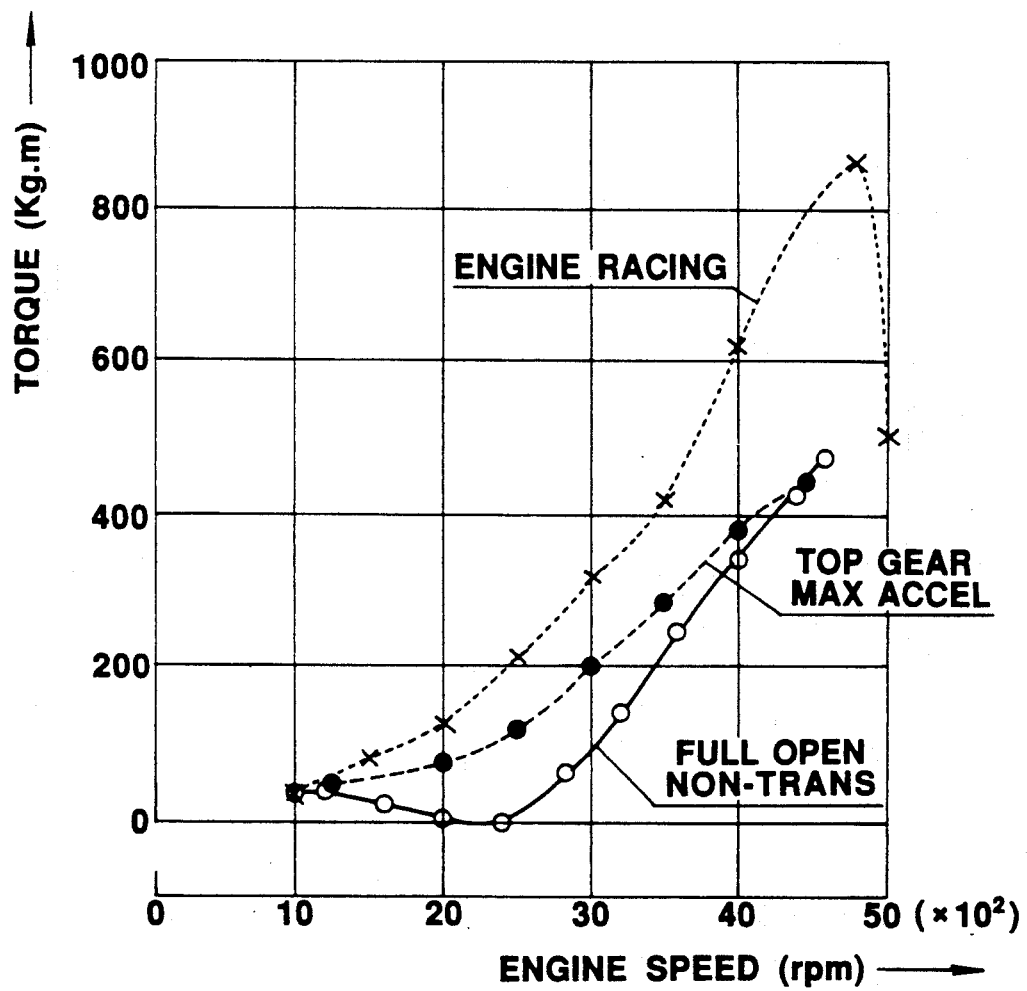
FIGS. 12 to 14 are graphs which shown in terms of respectively in terms of engine speed and pressure differential, engine speed and supercharge pressure PB and engine speed and exhaust pressure $P_{EX}$, the various relationships which develop between the above mentioned parameters in turbocharge type diesel engines.
Figure 13:
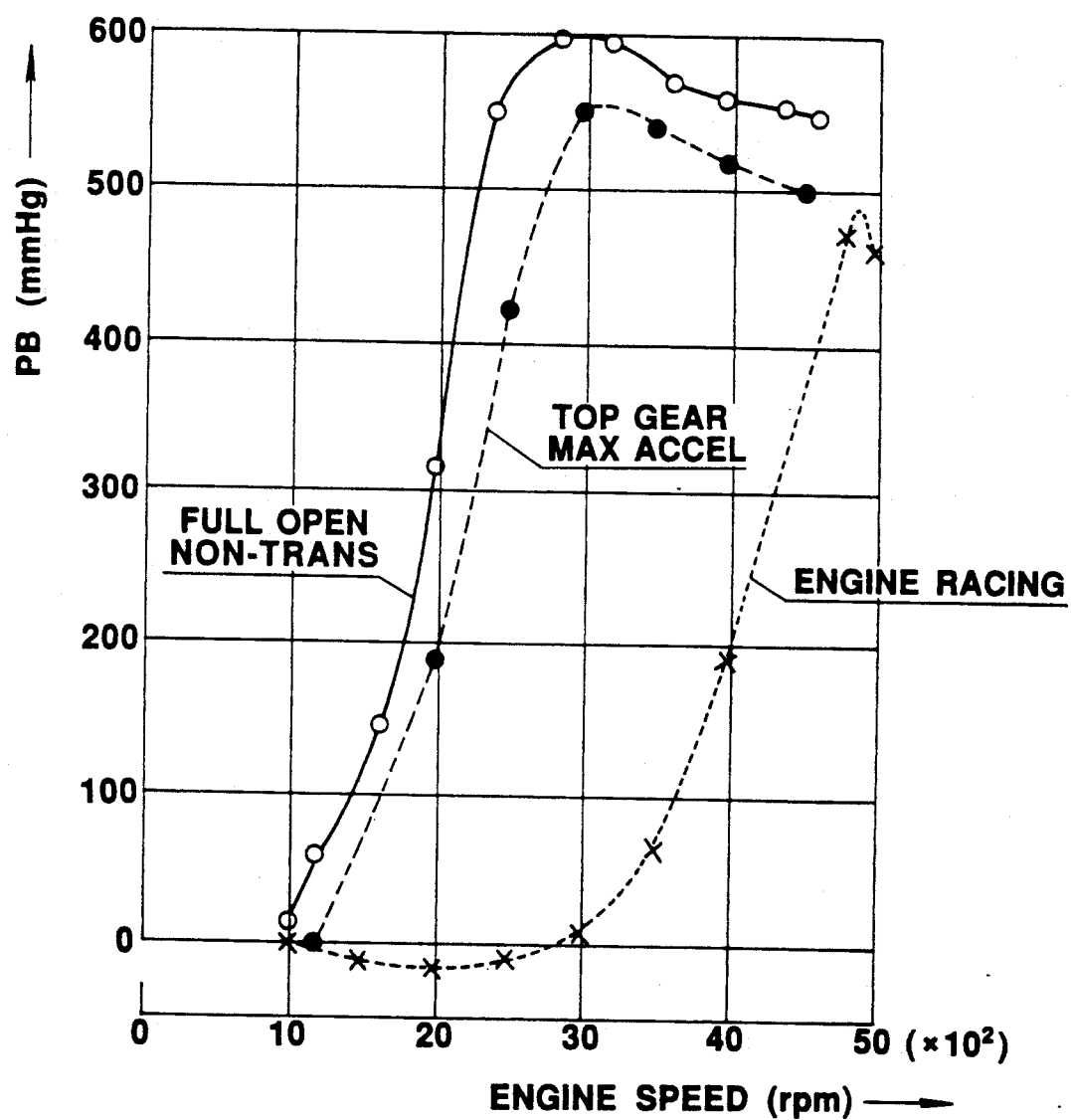
Figure 14:
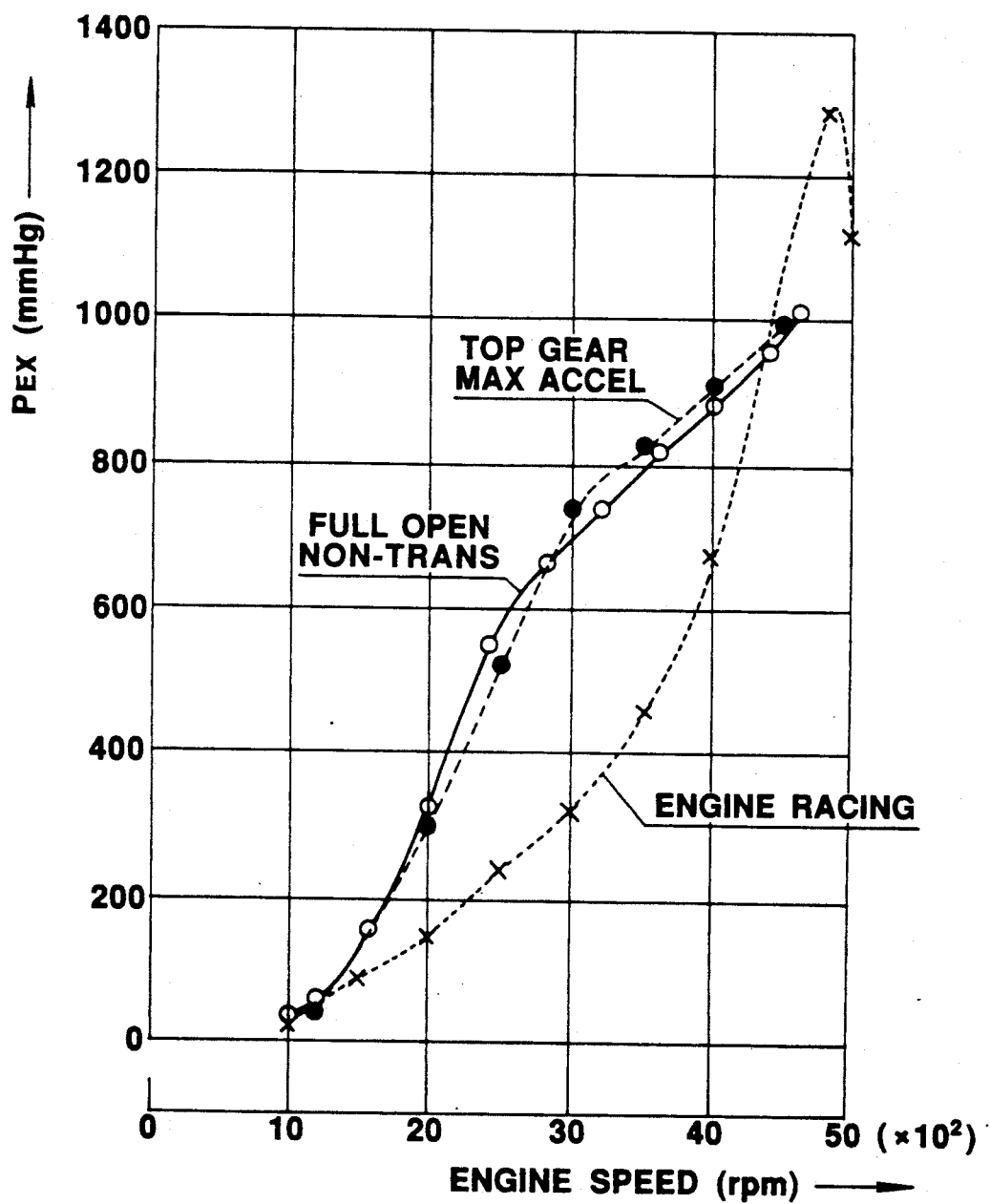

FIG. 2 shows an engine system to which an embodiment of the present invention is applied. In this arrangement a diesel engine 41 is provided with a fuel injection pump 42 which is essentially the same as shown and disclosed in connection with FIG. 10; an induction conduit 43 including the compressor 48 of a turbocharger 47; and an exhaust conduit 45 including an exhaust gas turbine 49 which is operatively connected with the compressor 48.

Pressure sensors 51 and 52 are arranged to sense the supercharge pressure PB prevailing in an induction manifold 44 and the exhaust pressure $P_{EX}$ prevailing in an exhaust manifold 46 upstream of the turbine 49, respectively. In this instance these sensors 51, 52 are fluidly communicated with the induction and exhaust manifolds by way of conduits 53 and 54 respectively.

The supercharge pressure snsor 51 is arranged to output a signal VPB while the exhaust pressure sensor 52 is arranged to output a signal $VP_{EX}$. These sensors may, by way of example, take the form of semiconductor type piezoelectric type strain gauge arrangements which are fabricated from silicon in a manner to define diaphragms which are exposed to the respective pressures.

An accelerator pedal depression sensor 55 is operatively connected with an accelerator pedal 56 asnd arranged to output a signal $V_\phi$ indicative of the amount of depression. An engine speed sensor 57 is arranged to generate a signal $V_N$. The outputs of these sensors are used to indicated the instant driving or operating conditions of the engine 41.

A control unit 61 is arranged to receive the inpus $VP_B$, $VP_{EX}$, $V_\phi$, and $V_N$ from the above mentioned sensors. As shown, this control unit 61 includes a microprocessor comprised basically of an input interface 62, a ROM 63, RAM 64 and a CPU 65.

The ROM contains a pre-recorded program which are designed to read in data from the I/O interface 62 and process the same. The result of the processing, which contains data indicative of the timing at which injection should be initiated and the period for which injection should be carried out, is set in the I/O interface 62 and subsequently output in the form of a injection control pulse to the control valve 14.

Figure 1:
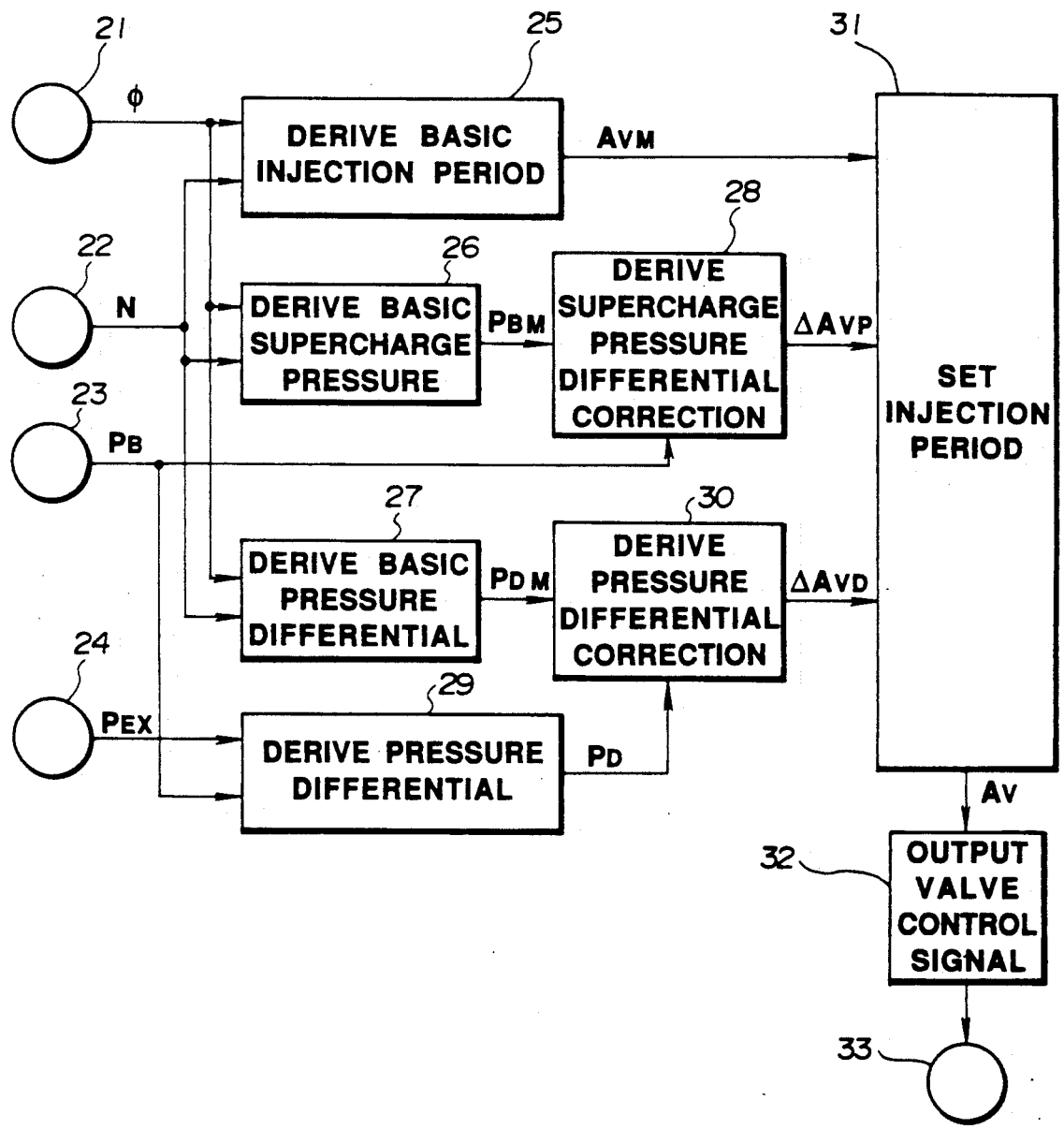
FIG. 1 is a block diagram showing the conceptual arrangement which underlies the present invention.

It should be noted that, as is conventional, the data which is read in from the I/O interface is temporarily stored and processed in the RAM and CPU 64, 65. It will of course be appreciated that all of the funtions 25-32 illustrated in the functional block diagram are performed and/or controlled by the control unit 62 in this particular instance; and that FIG. 1 is provided merely to illustrate the conceptual arrangement of the present invention.

Figure 3:
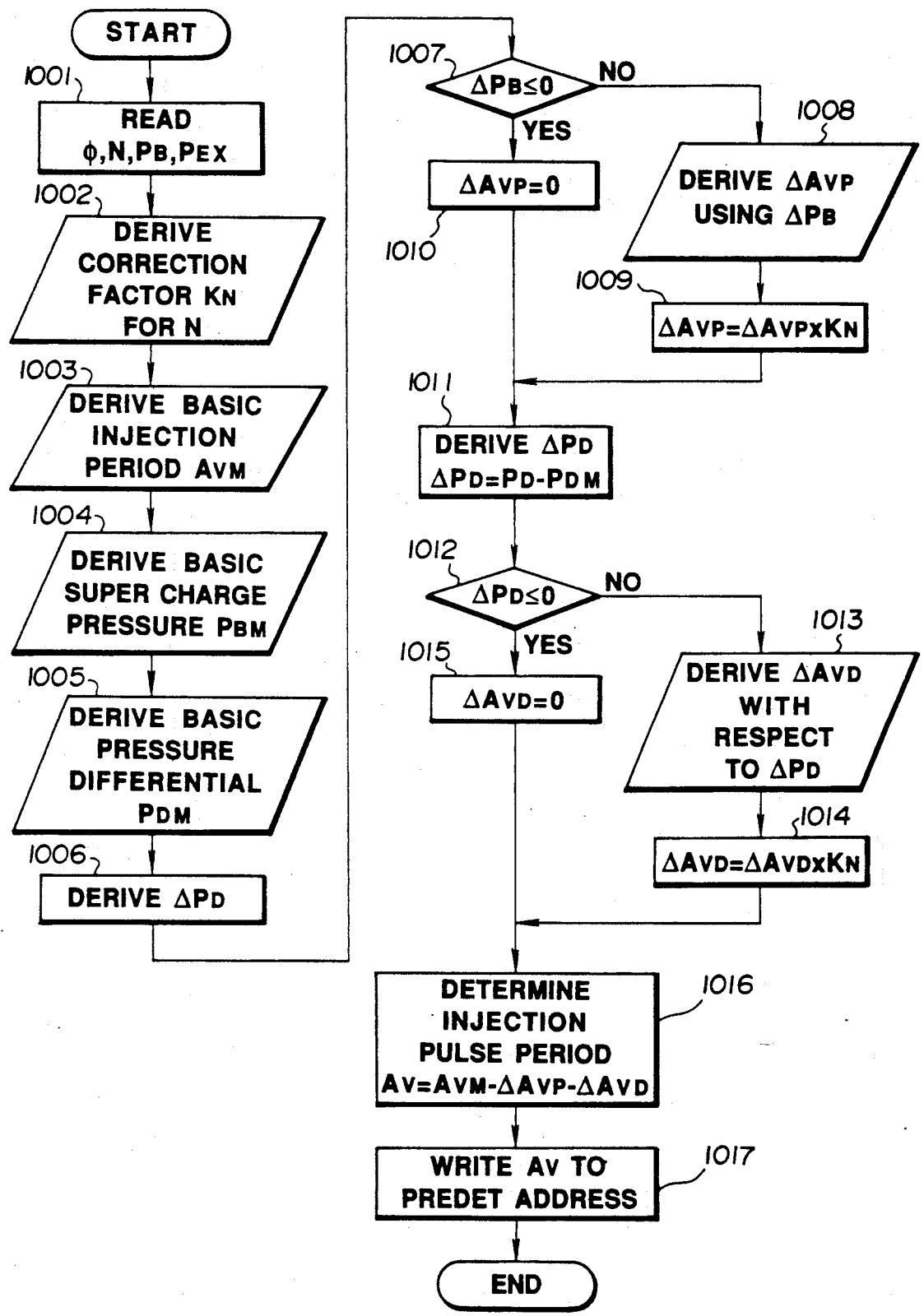
FIG. 3 is a flow chart depicting the steps which characterize the operation of an embodiment of the present invention.

FIG. 3 shows, in flow chart form, the steps which characterize the operation of the instant embodiment. The first step of this routine (1001) is such as to read in a fresh set of data necessary for the various calculations and to set this suitably in memory. In particular the isnstant accelerator pedal depression angle $\phi$, engine speed N, supercharge pressure PB and the exhaust pressure $P_{EX}$ values are read and set in memory ready for further processing.

Figure 9:
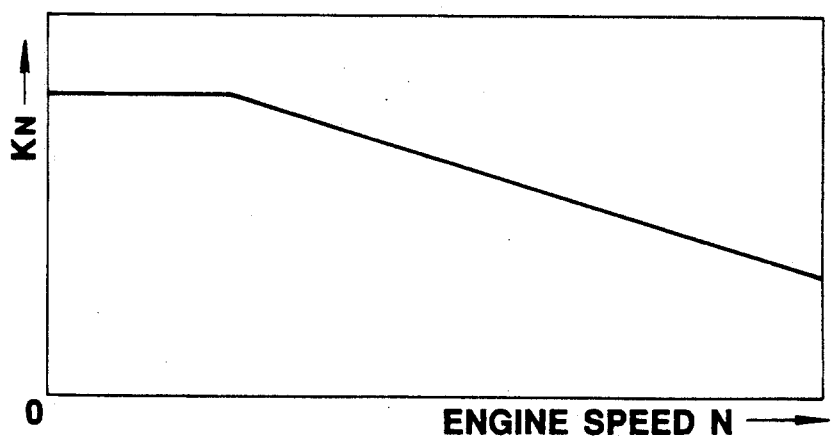

At step 1002 an injection period correction factor $K_N$ which varies with engine speed is derived using teh n data. This derivation is carried out using pre-recorded map data of the nature depicted in FIG. 9. As shown in this figure, as the engine speed N increases above a predetermined level, the value of correction factor $K_N$ decreases. The reason for this is that as the engine speed increases the efficiency of the fuel injection pump increases and in order to compensate for the corresponding increase in the amount of fuel actually discharged, it is necessary to slightly reduce the period for which the valve 14 is conditioned to assume an closed state.

Figure 4:
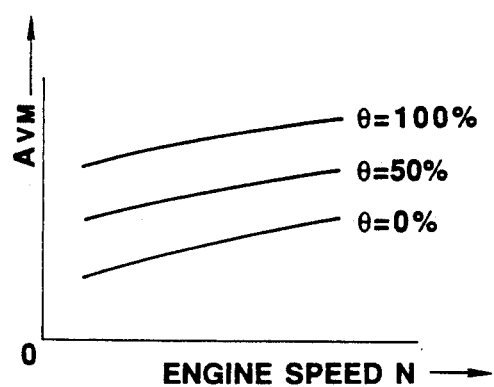
FIG. 4 is a graph depicting in terms of engine speed and basic injection timing mapped data which is used in the present invention to determine a basic injection amount.
Figure 11:
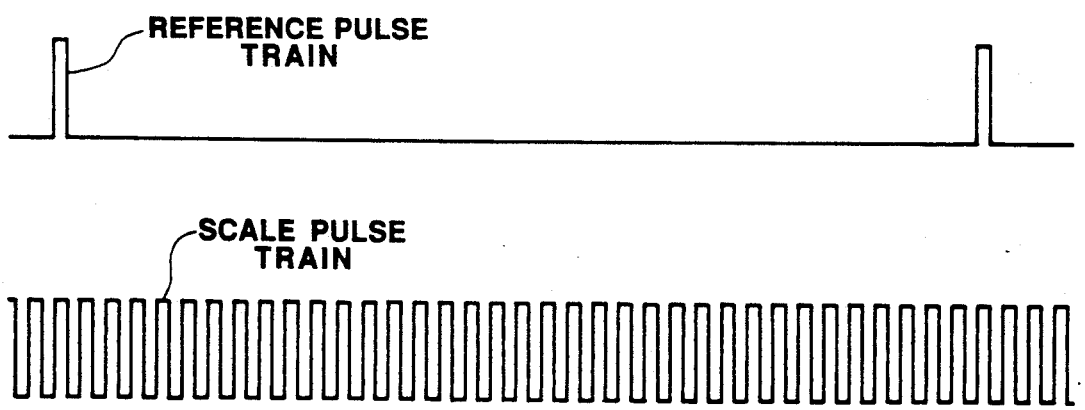
FIG. 11 is a timing chart showing two pulse trains which are produced in connection with the operation of the arrangement shown in FIG. 10.
Figure 6:
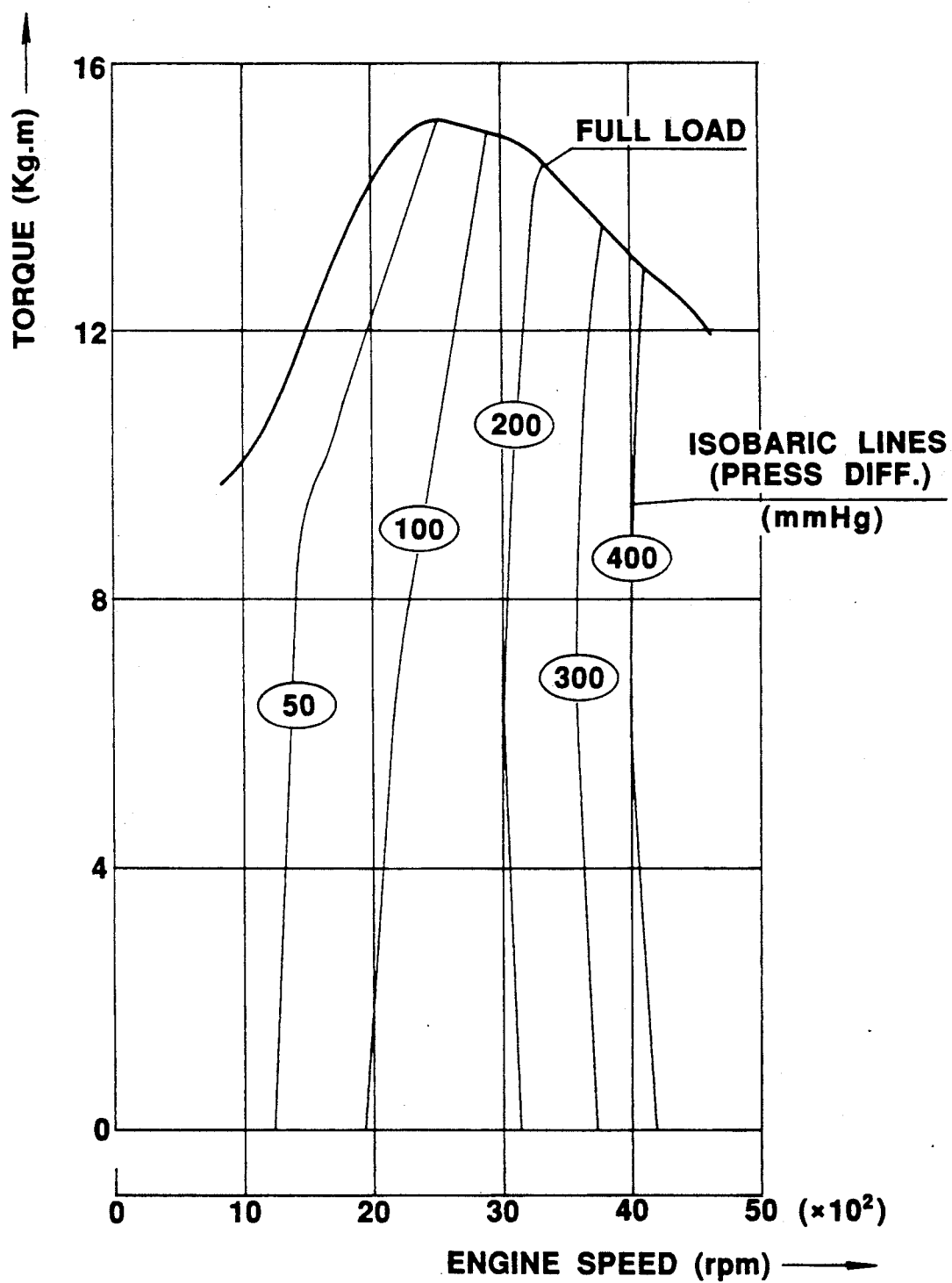

In steps 1003 to 1005 the basic injection period $A_{VM}$ and the non-transitory engine operation basic supercharge pressure $P_{BM}$ and non-transitory basic pressure differential $P_{DM}$ (pressure differential between the supercharge and exhaust gas pressures) are derived by table look-up. FIG. 4 shows an example of such map data. In this instance the data is recorded in terms of engine speed N and accelerator pedal depression degree $\phi$. Depending on the characteristics of the particular type of engine, data of the nature depicted in FIGS. 5 and 6 can be used. This data is recorded in terms of engine speed (N) and torque (as indicated by $\phi$). Given values of N and $\phi$ it is possible to determine which particular supercharge pressure $P_{BM}$ or pressure differential value $P_{DM}$, the coordinates (N,$\phi$) of the two parameters indicate.

In steps 1006 to 1010 the amount $\Delta AVP$ by which the supercharge pressure should be adjusted (see block 28 in FIG. 1) is derived. This involves deriving the difference between the theoretically correct and actual supercharge pressures, Viz., $\Delta PB = P_{BM} - PB$, at step 1006 and determining if a difference between the two values exists at step 1007. If the outcome of the enquiry at step 1007 is such as to indicate that $\Delta PB$ is less than 0 (viz., the instant supercharge pressure PB is equal to or greater than that theoretically required $P_{BM}$) then the routine flows to step 1010.

Figure 7:
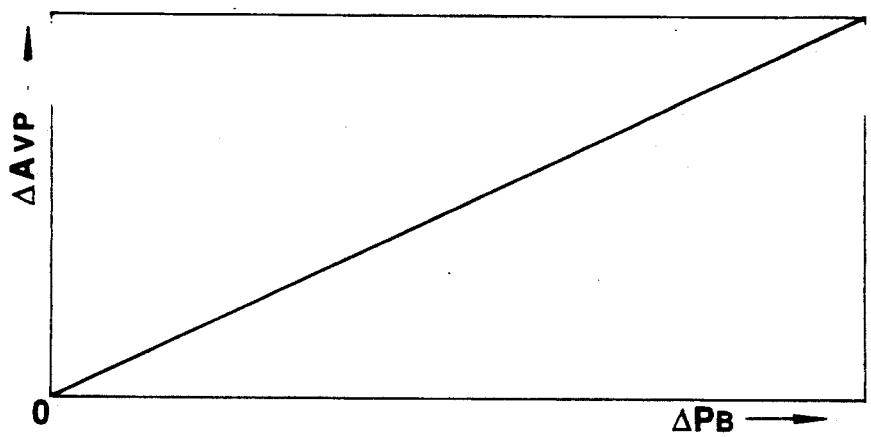
FIGS. 7 and 9 graphically depict mapped data which isused in connection with the control of the embodiment of the present invention.

On the other hand, if the instant supercharge pressure is ijdicated as being insufficient, then at step 1008 the value of $\Delta PB$ is used tod erive the amount $\Delta A_{VP}$ by which teh injection quantity should be reduced for the required pressure reduction. This derivation can be carried using table data of the nature depicted in FIG. 7.

At step 1009 the value of $\Delta A_{VP}$ by which the injection quantity should be reduced for the required pressure reduction. This derivation can be carried using table data of the nature depicted in FIG. 7.

At step 1009 the value of $\Delta A_{VP}$ is modified using the previously derived engine speed responsive injection period correction factor $K_N$, thus adjusting the correction with rsepect to the instant pump efficiency.

It will be noted that in the event that the instant supercharge pressure PB is less than the theoretically required $P_{BM}$ value, injection volume adjustment is not carried out.

In steps 1011 to 1015 the amount $\Delta A_{VD}$ by which it is necessary to adjust the pressure differential which exists between the supercharge and exhaust gas pressures. This firstly involves the derivation of the difference between the actual pressure differential and the theoretically correct one (step 1011). Viz., $\Delta_{PD} = P_D - P_{DM}$. It will be noted that $PD = P_{EX} - PB$. Accordingly, a subroutine can be run to derive the difference between the instant values of $P_{EX}$ and PB.

Figure 8:
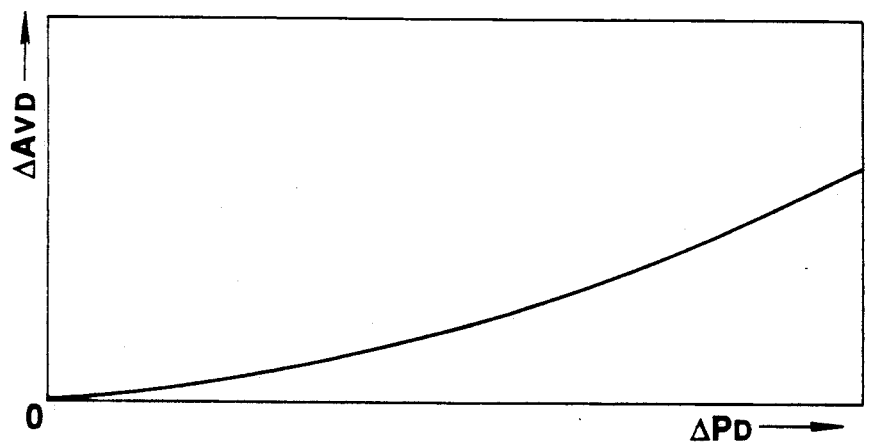

At step 1012 the actual pressure differential $P_D$ is compared with the theoretically derived $P_{DM}$ value. If the difference between the two is not equal to or less than zero, indicating that the actual pressure differential is greater than the theoretical one, then the routine flows to step 1013 wherein a fuel supply reduction amount $\Delta A_{VD}$ by which the pressure differential and hence the charging efficiency should be reduced, is derived. This derivation can be conducted using a look-up technique on tabled data which is arranged in the manner illustrated in FIG. 8.

At step 1014 $\Delta A_{VD}$ is modified with $K_N$ to take the effect of the instant engine speed (injection pump efficiency) into account.

In the event that step 1012 is such as to indicate that the instant pressure pressure differential is lses than theoretically required value and it is not necessary to reduce the charging efficiency effect, the value of $\Delta A_{VD}$ is set to zero (step 1015).

At step 1016 the injection period $A_V$ is determined by subtracting the two correction (reduction) amounts $\Delta A_{VP}$ and $\Delta A_{VD}$ from the $A_{VM}$ value derived in step 1003. This AV value is then written into memory at step 1017 and the routine ends.

A separate routine is used to convert the $A_V$ data into a pulse train signal having an appropriate pulse width. This signal is applied from the I/O interface 62 to the valve 14 by way of a suitable driver circuit 33.

OPERATION

The operation of the above described arrangement is such that during acceleration, the turbocharger lag induces the situation wherein the actual supercharge pressure PB is momentarily lower than the target or basic supercharge pressure $P_{BM}$. This induces a momentary reduction in the charging efficiency with which air is supplied into the cylinder or cylinders of the engine. At this time a basic injection period $A_{VM}$ is derived based on the amount of depression of the accelerator pedal $\phi$. However, this value is excessive under the instant set of circumstances. To correct this, a target supercharge pressure $P_{BM}$ is derived and used with the pressure prevailing in the induction system downstream of the turbocharger compressor to derive an amount $\Delta A_{VP}$ by which the $A_{VM}$ should be reduced.

However, under very rapid acceleration, this signal correction is insufficient. That is to say, under these conditions the differential between the supercharge and exhaust gas pressure increases and reduces the charging efficiency of the engine. Accordingly, a second correction value is derived. This correction value does not rely exclusively on the supercharge pressure and instead is derived by determining a target pressure differential valve $P_{DM}$ and comparing this with the actual differential. The result of this comparison $\Delta A_{VD}$ is also subtracted from the $A_{VM}$ value.

By using the second correction factor even under sudden acceleration, the amount of fuel which is injected is matched with the amount of air actually being charged into the cylinders and as a result, abnormally rich mixtures which produce smoke and the like are not formed. This results in the smoke emissions being reduced with an accompanying improvement in fuel economy and engine power output characteristics.

In summary, the present invention is such that two corrections are made to the volume of fuel injected. The first is based on supercharge pressure while the second is based on the difference between the supercharge and exhaust pressures. The first allows for the delay in supercharge pressure build up due to turbo lag under medium level acceleration while the second compensates for the loss in charging efficiency which occurs under more sudden acceleration.

What is claimed is:

1. In an internal combustion engine:
an exhaust gas powered turbocharger;
electronically controlled fuel injection means for controlling the injection of fuel into the engine, said electronically controlled fuel injection means being responsive to an injection control signal which determines the initiation timing and the period for which injection is carried out;
a supercharge pressure sensor for sensing the pressure prevailing in an induction system of the engine at a location downstream of a compressor of said turbocharger;
an exhaust gas pressure sensor for sensing the exhaust pressure prevailing in an exhaust system of the engine at a location upstream of a turbine of said turbocharger;
an engine speed sensor;
a power output demand sensor for sensing the power output demand on the engine;
control means responsive to said supercharge pressure sensor, said exhaust gas pressure sensor, said engine speed sensor and said power output demand sensor, said control means including circuitry for:
determining a target injection amount based on the instant engine speed and power output demand conditions;
determining a target supercharge pressure for the instant engine speed and power output demand conditions;
comparing the target supercharge pressure with the sensed supercharged pressure and determining a first injection reduction amount in the event that the sensed supercharge pressure is lower than the target supercharge pressure;
determining a target pressure differential which should exist between the supercharge pressure and the exhaust pressure;
determining the difference between the supercharge pressure and the exhaust gas pressure and determining an actual pressure differential;
comparing the target pressure differential and the actual differential and determining a second injection reduction amount in the event that the actual pressure differential is greater than the target pressure differential;
reducing the target injection amount by the first and second reduction amounts; and
producing the injection control signal and applying it to said electronically controlled fuel injection control means.

2. An internal combustion engine as claimed in claim 1 wherein said power output demand sensor comprises an accelerator pedal depression sensor which is operatively connected with an accelerator pedal associated with said engine.

3. In a method controlling an internal combustion engine having an exhaust gas powered turbocharger and an electronically controlled fuel injection means for injecting fuel into the engine, the electronically controlled fuel injection means being responsive to an injection control signal which determines the initiation timing and the period for which injection is carried out, the steps comprising:
sensing the pressure prevailing in an induction system of the engine at a location downstream of a compressor of said turbocharger;
sensing the exhaust pressure prevailing in an exhaust system of the engine at a location upstream of a turbine of said turbocharger;
sensing engine speed;
sensing the power output demand on the engine;
determining a target injection amount based on the instant engine speed and power output demand conditions;
determining a target supercharge pressure for the instant engine speed and power output demand conditions;

comparing the target supercharge pressure with the sensed supercharged pressure and determining a first injection reduction amount in the event that the sensed supercharge pressure is lower than the target supercharge pressure;

determining a target pressure differential which should exist between the supercharge pressure and the exhaust pressure;

determining the difference between the supercharge pressure and the exhaust gas pressure and determining an actual pressure differential;

comparing the target pressure differential and the actual differential and determining a second injection reduction amount in the event that the actual pressure differential is greater than the target pressure differential;

reducing the target injection amount by the first and second reduction amounts; and generating the injection control signal and applying it to said electronically controlled fuel injection control means.

4. A method as claimed in claim 3 wherein said step of sensing the power demand on the engine comprises sensing the depression of an accelerator pedal associated with the engine.

* * * * *